(12) United States Patent  
Ukai

(10) Patent No.: US 9,958,286 B2  
(45) Date of Patent: May 1, 2018

(54) IMAGE DISPLAY SYSTEM, MOBILE TERMINAL, SERVER, NON-TRANSITORY PHYSICAL COMPUTER-READABLE MEDIUM

(71) Applicant: DENSO CORPORATION, Kariya, Aichi-pref. (JP)

(72) Inventor: Hiroki Ukai, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 14/397,543

(22) PCT Filed: Apr. 24, 2013

(86) PCT No.: PCT/JP2013/002762  
§ 371 (c)(1),  
(2) Date: Oct. 28, 2014

(87) PCT Pub. No.: WO2013/168382  
PCT Pub. Date: Nov. 14, 2013

(65) Prior Publication Data  
US 2015/0134236 A1 May 14, 2015

(30) Foreign Application Priority Data

May 7, 2012 (JP) ................................ 2012-106051  
Jan. 28, 2013 (JP) ................................ 2013-013487

(51) Int. Cl.  
*G01C 21/36* (2006.01)  
*G06F 17/30* (2006.01)  
(Continued)

(52) U.S. Cl.  
CPC ......... *G01C 21/3605* (2013.01); *G01C 21/20* (2013.01); *G01C 21/3623* (2013.01);  
(Continued)

(58) Field of Classification Search  
CPC ... A61B 5/0536; A61B 5/4519; A61B 5/4893; A61B 2562/0209; A61B 2562/046;  
(Continued)

(56) References Cited

U.S. PATENT DOCUMENTS 6,466,865 B1 10/2002 Petzold  
2003/0016781 A1* 1/2003 Huang ................... A61B 6/022  
378/41

(Continued)

FOREIGN PATENT DOCUMENTS

JP 11088866 A * 3/1999 ........... G06F 3/0485  
JP 2002228470 A 8/2002  
(Continued)

OTHER PUBLICATIONS

International Search Report and Written Opinion (in Japanese with English Translation) for PCT/JP2013/002762, dated Jul. 23, 2013; ISA/JP.

Primary Examiner — Anne M Antonucci  
Assistant Examiner — Sanjeev Malhotra  
(74) Attorney, Agent, or Firm — Harness, Dickey & Pierce, P.L.C.

(57) ABSTRACT

An image display system includes: a server having a storage device that stores images; and a mobile terminal having a display device that displays the images acquired from the server. The mobile terminal includes: an operation input device that input a refinement condition of images and selects a display image; and a control device that sets a location related to a selected image as a destination. The server includes an extraction device that extracts multiple images according to the refinement condition obtained from the mobile terminal.

15 Claims, 12 Drawing Sheets

(51) Int. Cl.
  *G09B 29/10* (2006.01)
  *G01C 21/20* (2006.01)
  *G09G 5/36* (2006.01)
  *G06F 3/0484* (2013.01)

(52) U.S. Cl.
  CPC ...... *G06F 3/04842* (2013.01); *G06F 3/04847* (2013.01); *G06F 17/30* (2013.01); *G06F 17/30265* (2013.01); *G06F 17/30268* (2013.01); *G09B 29/106* (2013.01); *G09G 5/36* (2013.01); *G09G 2320/10* (2013.01); *G09G 2354/00* (2013.01); *G09G 2380/10* (2013.01)

(58) Field of Classification Search
  CPC ....... G06F 3/03; G06F 3/041; G06Q 30/0601; G06Q 30/0603; G06Q 30/0643; G06T 5/008
  USPC ........ 701/527; 709/203, 299; 705/14.73, 14, 705/26, 14.36, 319, 14.26; 607/48; 600/547; 382/103; 340/425.5; 345/173; 455/456.1, 456.3; 342/357.43; 707/737, 707/784; 358/1.15; 725/46
  See application file for complete search history.

(56) References Cited

U.S. PATENT DOCUMENTS

| | | | |
|---|---|---|---|
| 2004/0267443 A1 | 12/2004 | Watanabe | |
| 2005/0055451 A1* | 3/2005 | Tsuyama | G06F 17/3028 709/229 |
| 2006/0085049 A1* | 4/2006 | Cory | A61B 5/0536 607/48 |
| 2008/0077959 A1* | 3/2008 | Kirimura | H04N 5/44543 725/46 |
| 2008/0144094 A1* | 6/2008 | Itoh | G06F 17/30265 358/1.15 |
| 2008/0264701 A1* | 10/2008 | Radtke | G06F 3/03545 178/19.01 |
| 2008/0281797 A1* | 11/2008 | Hori | G06F 17/30259 |
| 2009/0037449 A1* | 2/2009 | Fagans | G06F 17/3028 |
| 2009/0112862 A1* | 4/2009 | Mo | G06F 17/30247 |
| 2010/0045518 A1* | 2/2010 | Lee | H04N 1/00307 342/357.43 |
| 2010/0082684 A1* | 4/2010 | Churchill | G06F 17/30867 707/784 |
| 2011/0082383 A1* | 4/2011 | Cory | A61B 5/0536 600/547 |
| 2011/0143779 A1* | 6/2011 | Rowe | G06Q 30/02 455/456.3 |
| 2011/0256886 A1* | 10/2011 | Velusamy | G01S 5/0009 455/456.1 |
| 2012/0041952 A1* | 2/2012 | Sohma | G06F 17/30719 707/737 |
| 2012/0078513 A1* | 3/2012 | Oaki | G01C 21/3664 701/527 |
| 2012/0179531 A1* | 7/2012 | Kim | G06Q 30/0225 705/14.26 |
| 2012/0239485 A1* | 9/2012 | Hu | G06Q 30/0207 705/14.36 |
| 2012/0259790 A1* | 10/2012 | Hu | G06Q 30/0207 705/319 |
| 2013/0004021 A1* | 1/2013 | Nagaoka | B60R 1/00 382/103 |
| 2013/0106591 A1* | 5/2013 | Kamijo | B60Q 1/00 340/425.5 |
| 2013/0212169 A1* | 8/2013 | Nakagawa | H04N 5/44543 709/203 |
| 2014/0052549 A1* | 2/2014 | Dollens | G06Q 30/0643 705/14.73 |
| 2014/0098028 A1* | 4/2014 | Kwak | G09G 5/00 345/173 |

FOREIGN PATENT DOCUMENTS

| | | |
|---|---|---|
| JP | 2002530658 A | 9/2002 |
| JP | 2004333233 A | 11/2004 |
| JP | 2008249428 A | 10/2008 |
| JP | 2010266410 A | 11/2010 |
| JP | 2011133230 A | 7/2011 |
| JP | 2012037475 A | 2/2012 |
| JP | 2012122778 A | 6/2012 |

* cited by examiner

IMAGE DISPLAY SYSTEM, MOBILE TERMINAL, SERVER, NON-TRANSITORY PHYSICAL COMPUTER-READABLE MEDIUM

CROSS REFERENCE TO RELATED APPLICATIONS

This application is a U.S. National Phase Application under 35 U.S.C. 371 of International Application No. PCT/JP2013/002762 filed on Apr. 24, 2013 and published in Japanese as WO 2013/168382 A1 on Nov. 14, 2013. This application is based on and claims the benefit of priority from Japanese Patent Applications No. 2012-106051 filed on May 7, 2012, and No. 2013-013487 filed on Jan. 28, 2013. The entire disclosures of all of the above applications are incorporated herein by reference.

TECHNICAL FIELD

The present disclosure relates to an image display system that includes a server storing images and a mobile terminal to display a plurality of images acquired from the server, a mobile terminal, a server, and a non-transitory physical computer-readable medium.

BACKGROUND ART

A photo information providing service to store images, such as photographs, on the side of a server connected to a network and to make the images available to an individual or more than one individual is now provided. For example, Patent Literature 1 describes a photo information providing service configured in such a manner so as to store images as well as spot information, such as shooting locations of the images, into a server and to provide spot information on a specified spot to a navigation device. This configuration enables a user, for example, to move to the shooting location accurately.

Incidentally, a large number of images are stored in a server providing the photo information providing service. Also, content providers per se that provide the photo information providing service are increasing recently. Hence, because a myriad of images are available on the network, it is necessary to use a function to filter images to those the user wishes to use.

However, the configuration to filter images by specifying a spot as in Patent Literature 1 described above makes it difficult for a user to filter images unless he specifies a spot. Further, even when the user specifies a spot, images he wishes to view may not be stored for the specified spot.

PRIOR ART LITERATURES

Patent Literature

Patent Literature 1: JP-A-2012-37475

SUMMARY OF INVENTION

It is an object of the present disclosure to provide to provide an image display system, a mobile terminal, a server, and a non-transitory physical computer-readable medium, each of which is capable of filtering images to those a user wishes to view without the user having to specify a particular spot and thereby enabling the user to determine a destination he wishes to visit from the resulting images.

According to a first aspect of the present disclosure, an image display system includes: a server having a storage device that stores a plurality of images; and a mobile terminal having a display device that displays the plurality of images acquired from the server. The mobile terminal includes: an operation input device that performs an operation to input a refinement condition for specifying a type of images and an operation to select at least one image from the plurality of images displayed on the display device; and a control device that sets a location related to the image selected by the operation input device as a destination. The server includes an extraction device that extracts the plurality of images according to the refinement condition obtained from the mobile terminal.

The system as above does not fail to include images the user wishes to view in the filtered images, so that the user can filter images to those he wishes to view without having to specify a particular spot and determine a destination he wishes to visit among these images.

According to a second aspect of the present disclosure, a mobile terminal is utilized in the image display system according to the first aspect.

The mobile terminal as above does not fail to include images the user wishes to view in the filtered images, so that the user can filter images to those he wishes to view without having to specify a particular spot and determine a destination he wishes to visit among these images.

According to a third aspect of the present disclosure, a server is utilized in the image display system according to the first aspect.

The server as above does not fail to include images the user wishes to view in the filtered images, so that the user can filter images to those he wishes to view without having to specify a particular spot and determine a destination he wishes to visit among these images.

According to a fourth aspect of the present disclosure, a non-transitory physical computer-readable medium comprises instructions being executed by a computer. The instructions include a computer-implemented method for displaying images, and the instructions include: storing a plurality of images in a storage device of a server; displaying the plurality of images acquired from the server on a display device in a mobile terminal; inputting a refinement condition for specifying a type of the images in the mobile terminal, and selecting at least one image from the plurality of images displayed on the display device; setting a location related to selected at least one image as a destination; and extracting the plurality of images in the server according to the refinement condition obtained from the mobile terminal.

With the non-transitory physical computer-readable medium, images the user wishes to view are included in the filtered images without fail, so that the user can filter images to those he wishes to view without having to specify a particular spot and determine a destination he wishes to visit among these images.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, embodiments of the present disclosure will be described with reference to the drawings.

First Embodiment

A first embodiment of the present disclosure will be described in the following with reference to FIG. 1 through FIG. 13.

Figure 1:
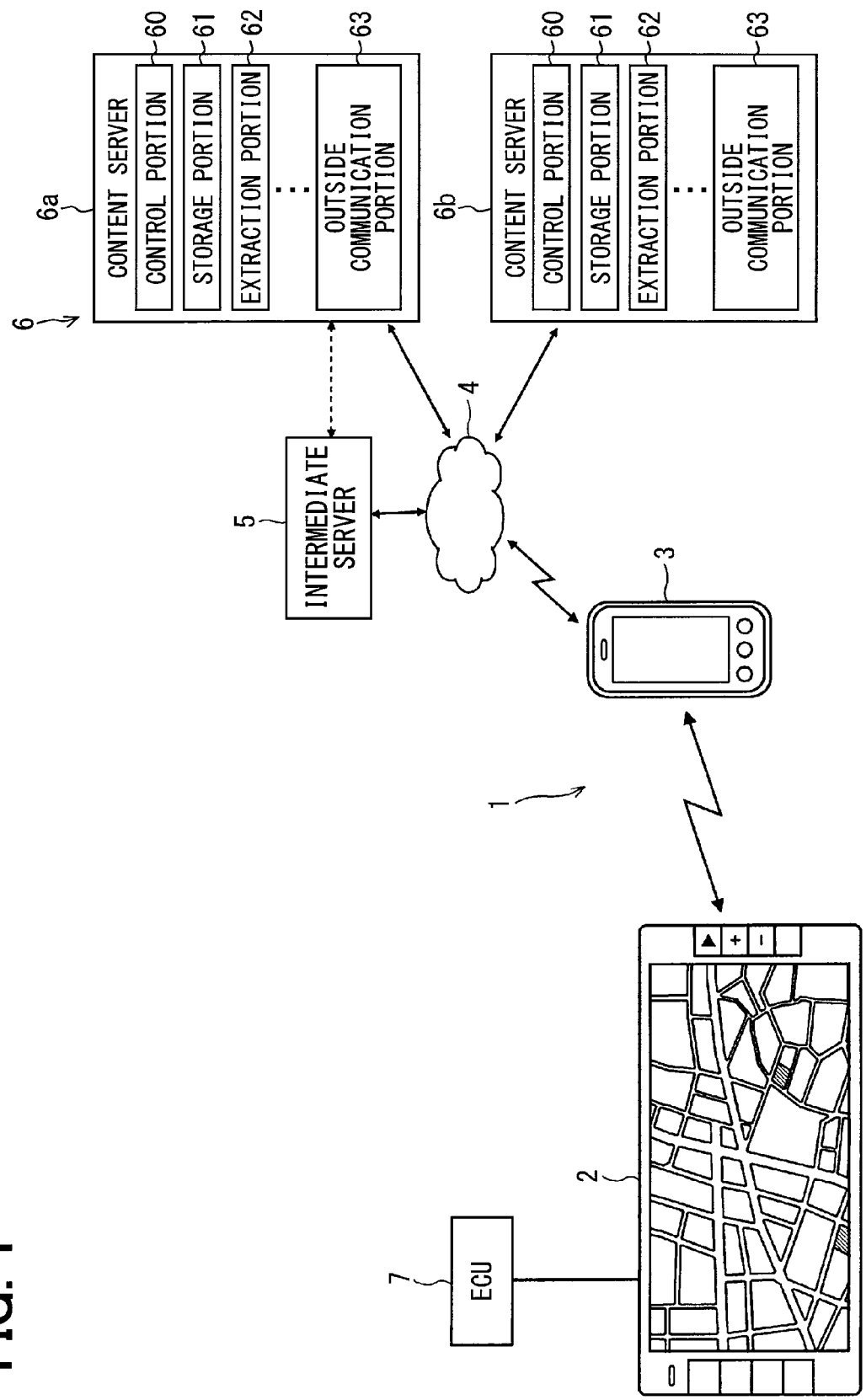
FIG. 1 is a diagram schematically showing a configuration of an image display system of a first embodiment disclosed herein.

As is shown in FIG. 1, an image display system 1 includes an image display device 2, a portable communication terminal 3, an intermediate server 5, and a content server 6. The image display device 2 and the portable communication terminal 3 form a mobile terminal. The intermediate server 5 and the content server 6 form a server. In the image display system 1, the mobile terminal (in this embodiment, the image display device 2 and the portable communication terminal 3) is connected to the server (in this embodiment, the intermediate server 5 and the content server 6) via an outside network 4 to enable communications therebetween. Also, the content server 6 is formed of a content server 6a and a content server 6b. The content server 6a corresponds to a first server and the content server 6b corresponds to a second server. The terms, "first" and "second", are used not to limit the number of the servers but to describe that the image display system 1 is connectable to different servers. In short, the image display system 1 may include three or more content servers 6.

The image display device 2 is equipped to an unillustrated vehicle. More specifically, of the mobile terminal, the image display device 2 is a vehicle mobile terminal used as a vehicle device in this embodiment. In this case, the image display device 2 is not limited to a type provided fixedly, for example, in a vehicle interior, and can also be of a type provided in a movable manner.

Firstly, a utility form of contents in the image display system 1 will be described briefly. The image display system 1 can use various contents provided by the content server 6. Examples of available contents include but not limited to a photo information providing service, a POI (Point Of Interest) search service, an SNS (Social Networking Service), and a music streaming service. These contents are not necessarily provided by a single content provider and may be provided by more than one content provider. In other words, the content server 6a and the content server 6b may be managed separately by different content providers or may be managed by the same content provider. Hereinafter, the content servers 6a and 6b are referred to simply as the content server(s) 6 when descriptions are common.

These contents are often provided in data formats determined by respective content providers. The image display system 1 is therefore provided with the intermediate server 5 that converts contents provided in various data formats from the respective content providers to a unified data format between the mobile terminal and the content server 6.

This embodiment will describe a photo information providing service among various services mentioned above. The photo information providing service is a service to store photographs (images) posted from a user on the side of the content server 6 and to make the stored photographs available to the user or a third party. The photo information providing service can also be a service that provides not only still images, such as photographs and CGs, but also videos taken by the user.

Figure 2:
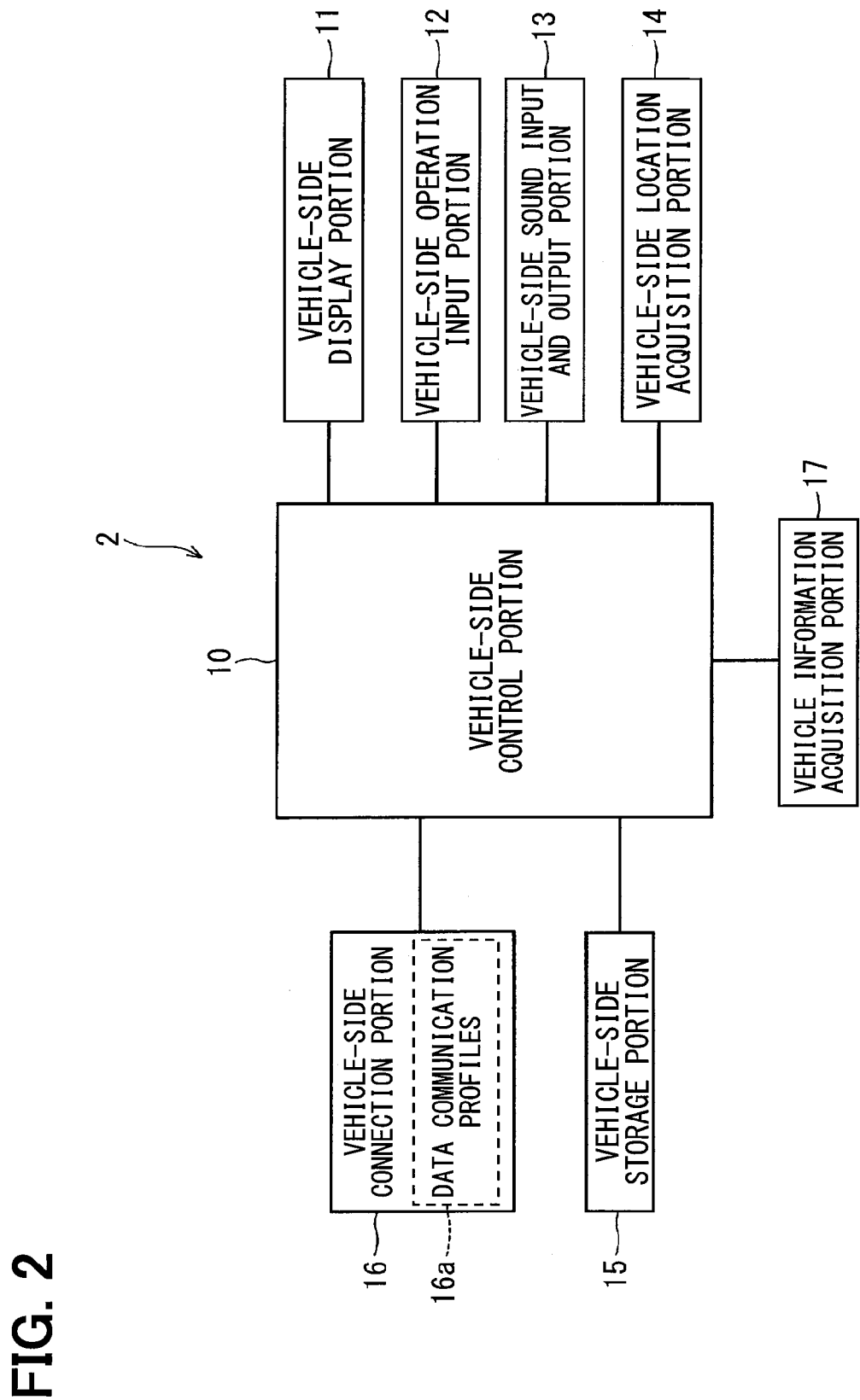
FIG. 2 is a diagram schematically showing a configuration of an image display device.

As is shown in FIG. 2, the image display device 2 has a vehicle-side control portion 10, a vehicle-side display portion 11, a vehicle-side operation input portion 12, a vehicle-side sound input and output portion 13, a vehicle-side location acquisition portion 14, a vehicle-side storage portion 15, a vehicle-side connection portion 16, and a vehicle information acquisition portion 17. The vehicle-side control portion 10 is formed of an unillustrated micro-computer having a CPU, a ROM, a RAM, and so on, and controls the entire image display device 2 according to programs stored in the ROM or the like. Also, the vehicle-side control portion 10 can run an application to make various contents available and operating in cooperation with the portable communication terminal 3. Also, as will be described below, the vehicle-side control portion 10 can set a destination and perform a navigation function to provide navigation to the set destination. The vehicle-side control portion 10 forms a control device.

The vehicle-side display portion 11 is formed, for example, of a liquid crystal display, an organic EL display, or a plasma display, each of which is capable of displaying colors. The vehicle-side display portion 11 displays, for example, an operation screen of the image display device 2 and a map screen when the navigation function is in use. As will be described below, the vehicle-side display portion 11 also displays an operation screen via which a user makes an input when he requests a search as well as acquired images. In this instance, the vehicle-side display portion 11 displays the acquired images in a list format to display two or more images concurrently or in a slide-show format to display one image by sequentially switching images. The vehicle-side display portion 11 forms a display device.

The vehicle-side operation input portion 12 is formed of a touch panel provided correspondingly to the vehicle-side display portion 11 and contact switches arranged on a periphery of the vehicle-side display portion 11. The user inputs an operation on the image display device 2 from these elements forming the vehicle-side operation input portion 12. A touch panel of any type, for example, a touch panel of a pressure-sensitive type, an electromagnetic induction type, or an electrostatic induction type, can be adopted. The vehicle-side operation input portion 12 together with the vehicle-side display portion 11 forms an operation input device.

The vehicle-side sound input and output portion 13 has unillustrated speaker and microphone. The vehicle-side sound input and output portion 13 outputs, for example, music stored in the vehicle-side storage portion 15 and a guiding voice from the image display device 2. Also, a user's voice operation on the image display device 2 or the like is inputted into the vehicle-side sound input and output portion 13. The vehicle-side location acquisition portion 14 has so-called a GPS unit and a gyro sensor, and acquires a current location of the image display device 2, more specifically, a current location of the vehicle provided with the image display device 2. The vehicle-side location acquisition portion 14 forms a current location acquisition device. A method of acquiring a current location by the GPS unit or the like is known and a detailed description is omitted herein.

On the basis of the location of the vehicle acquired in the vehicle-side location acquisition portion 14, the vehicle-side control portion 10 performs navigation processing to guide the vehicle to the destination as mentioned above. In short, so-called a navigation device is used as the image display device 2 in this embodiment. The vehicle-side storage portion 15 stores therein music data, map data used for the navigation function, and various applications run on the image display device 2.

The vehicle-side connection portion 16 makes communications with the portable communication terminal 3. In this embodiment, a wireless communication system compatible with Bluetooth (registered trademark) is adopted. Hereinafter, Bluetooth (registered trademark) is abbreviated to BT and a connection by BT is referred to as the BT connection. The vehicle-side connection portion 16 has, for example, data communication profiles 16a (in the case of BT, corresponding to SPP and DUN), and connects to the portable communication terminal 3 using such profiles.

The vehicle information acquisition portion 17 connects to an ECU 7 and acquires various types of information on the vehicle. The vehicle information acquisition portion 17 acquires information on the vehicle, for example, information on a speed of the vehicle (hereinafter, referred to as the vehicle speed) and a set temperature of an air-conditioner. Of the information acquired by the vehicle information acquisition portion 17, information capable of determining whether the vehicle is travelling or not corresponds to vehicle information. In this embodiment, information indicating the vehicle speed or a travelling state of the vehicle (for example, data indicating that the vehicle is at rest when a parking brake is ON and data indicating that the vehicle is at rest when a shift range is a parking range) is adopted as the vehicle information. The vehicle information acquisition portion 17 forms a vehicle information acquisition device.

Figure 3:
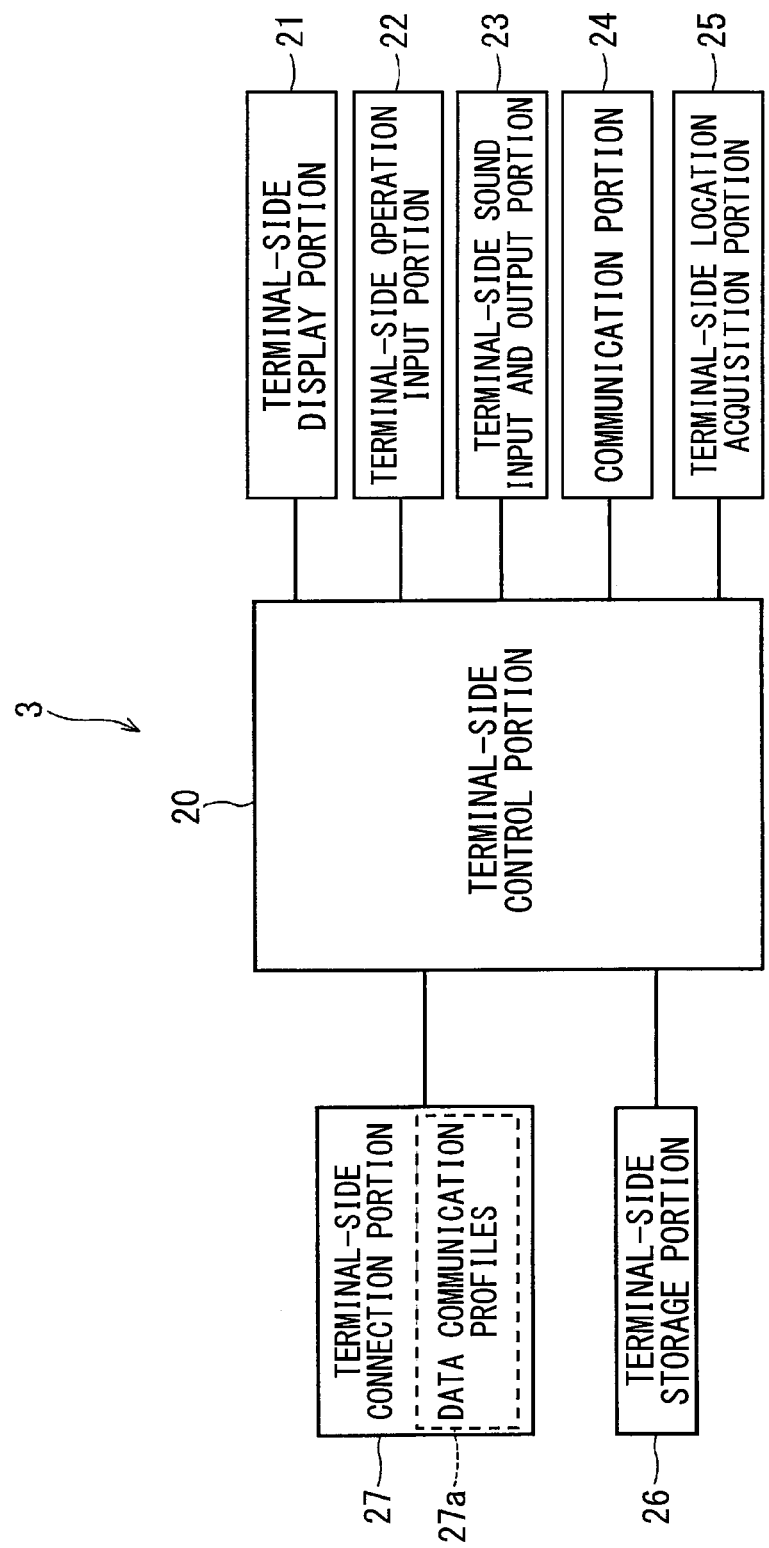
FIG. 3 is a diagram schematically showing a configuration of a portable communication terminal.

As is shown in FIG. 3, the portable communication terminal 3 has a terminal-side control portion 20, a terminal-side display portion 21, a terminal-side operation input portion 22, a terminal-side sound input and output portion 23, a communication portion 24, a terminal-side location acquisition portion 25, a terminal-side storage portion 26, and a terminal-side connection portion 27. In this embodiment, the portable communication terminal 3 is assumed to be so-called a smartphone. The terminal-side control portion 20 is formed of an unillustrated micro-computer having a CPU, a ROM, a RAM, and so on, and controls the entire portable communication terminal 3 according to programs stored in the ROM or the like. Also, the terminal-side control portion 20 is connected to the image display device 2 and can therefore communicate with the image display device 2. Hence, the terminal-side control portion 20 runs feasible applications in cooperation with the image display device 2. Also, as will be described below, the portable communication terminal 3 acquires images from the content server 6 and transmits the acquired images to the image display device 2. The terminal-side control portion 20 corresponds to the control device.

The terminal-side display portion 21 is formed, for example, of a liquid crystal display or an organic EL display, each of which is capable of displaying colors. The terminal-side display portion 21 displays, for example, phone book data and images and videos stored, for example, in the terminal-side storage portion 26. The terminal-side operation input portion 22 is formed of a touch panel provided correspondingly to the terminal-side display portion 21 and contact switches arranged on a periphery of the terminal-side display portion 21. An operation on the portable communication terminal 3 is inputted into the portable communication terminal 3 from these elements forming the terminal-side operation input portion 22. A touch panel of any type, for example, a touch panel of a pressure-sensitive type, an electromagnetic induction type, or an electrostatic induction type, can be adopted. The terminal-side operation input portion 22 corresponds to the operation input device.

The terminal-side sound input and output portion 23 has unillustrated microphone and speaker, and uttered sounds are inputted therein and received sounds are outputted therefrom during a call. The terminal-side sound input and output portion 23 also outputs, for example, music and sounds of videos stored in the terminal-side storage portion 26. The communication portion 24 performs a wide area communication by connecting to a public circuit-switched telephone network and the network 4. The communication portion 24 makes a call and transmits data to and receives data from the network 4. The terminal-side location acquisition portion 25 has so-called a GPS unit and a gyro sensor, and acquires a current location of the portable communication terminal 3. A method of acquiring a current location by the GPS unit or the like is known and a detailed description is omitted herein. The terminal-side storage portion 26 stores therein phone book data and music as well as various applications run on the portable communication terminal 3 and data saved by the user. The terminal-side location acquisition portion 25 corresponds to the current location acquisition device.

The terminal-side connection portion 27 makes communications with the image display device 2. In this embodiment, a BT-compatible wireless communication system is adopted as described above and the portable communication terminal 3 connects to the image display device 2 by a BT connection. As with the image display device 2, the terminal-side connection portion 27 has data communication profiles 27a (in this embodiment, SPP and DUN), and connects to the image display device 2 using such profiles. Profiles are not limited to data communication profiles and the terminal-side connection portion 27 may have, for example, a hands-free profile (HFP in the case of BT).

As is shown in FIG. 1, the content server 6 includes a control portion 60, a storage portion 61, an extraction portion 62, and an outside communication portion 63. The control portion 60 is formed of an unillustrated computer having a CPU, a ROM, a RAM, and so on, and controls the entire content server 6 according to computer programs stored in the ROM and the storage portion 61. The storage portion 61 stores therein data of respective services provided from the content server 6, for example, images provided by a photo information providing service described below. As will be described below, the extraction portion 62 extracts images filtered according to refinement conditions among images stored in the storage portion 61. In this embodiment, the extraction portion 62 is a software-based portion realized by a program run on the control portion 60. The extraction portion 62 corresponds to an extraction device. The outside communication portion 63 connects to the network 4 and transmits data to and receives data from the mobile terminal side and the intermediate server 5 via the portable communication terminal 3.

A function of the configuration as above will now be described. In a flowchart described in the following, the portable communication terminal 3 is denoted as SP and a description will be given on the basis of the image display device 2.

Figure 4:
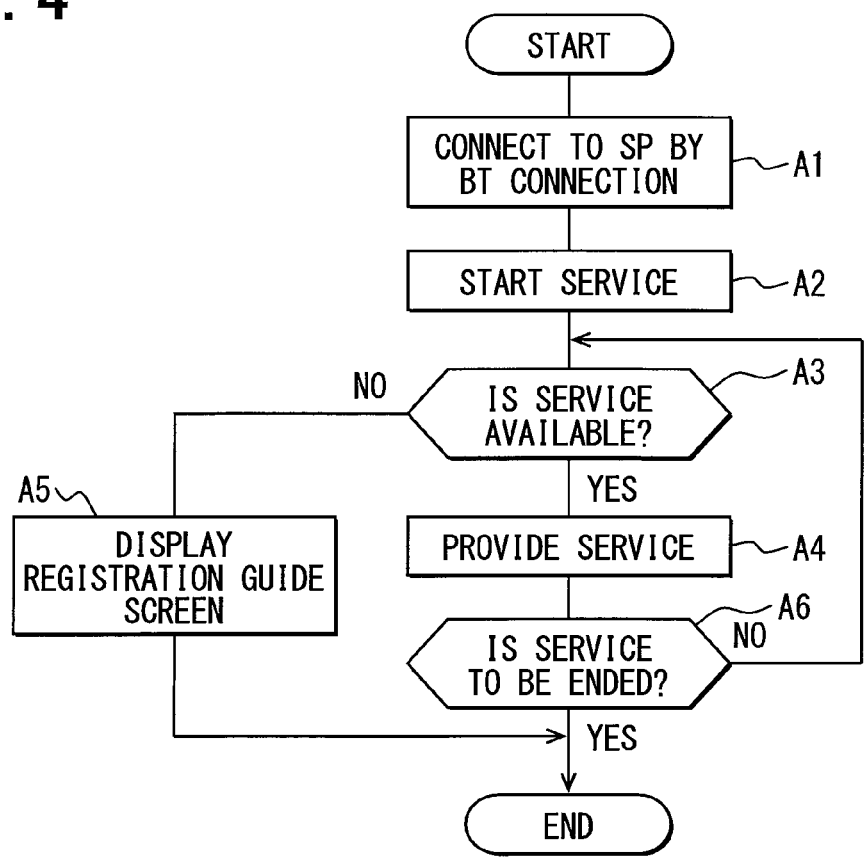
FIG. 4 is a chart schematically depicting a main flow of control in the image display device.
Figure 5:
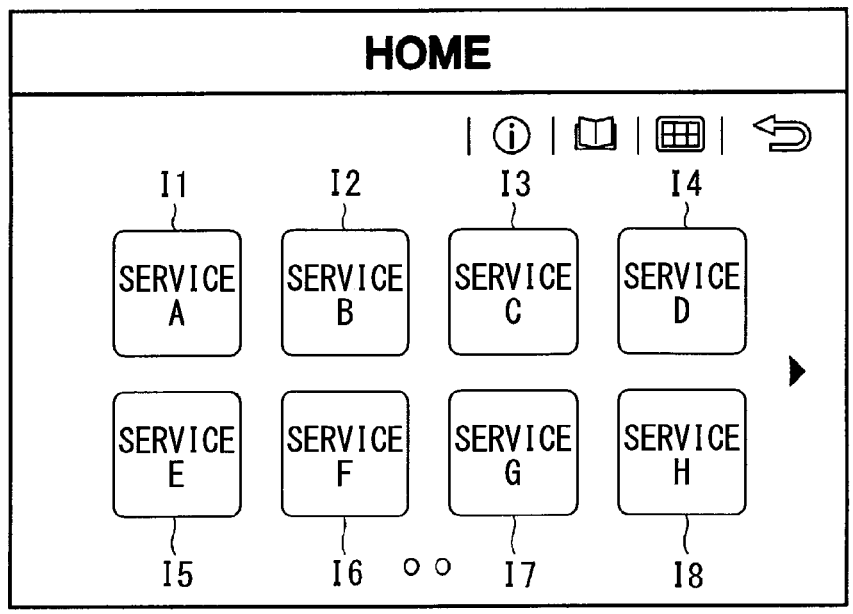
FIG. 5 is a diagram schematically showing a home screen on the image display device.

Firstly, processing performed in the image display device 2 will be briefly described with reference to FIG. 4 and FIG. 5. As is depicted in FIG. 4, after a start (ACC of the vehicle is switched ON), the image display device 2 connects to the portable communication terminal 3 (SP) by a BT connection (A1) and starts a service (A2). To start a service at Step A2 means to start an operation in cooperation with the portable communication terminal 3 so as to use a service (contents) provided from the content server 6 via the portable communication terminal 3. In this instance, as is shown in FIG. 5, the image display device 2 displays on the vehicle-side display portion 11 a home screen, in which icons I1 through I8 corresponding to a service A through a service H to be used are arranged.

The user selects a desired service (see FIG. 1) by an operation to touch any one of the icons I1 through I8. In the case of FIG. 5, the icon I1 is provided correspondingly to a service A, the icon I2 to a service B, the icon I3 to a service C, and so on. It should be appreciated that the types of contents are not limited to those shown in the drawing.

As is depicted in FIG. 4, the image display device 2 subsequently determines whether the selected service is available or not (A3). More specifically, the image display device 2 determines at Step A3 whether settings to use the service provided from the content service 6 are already made or not. For example, the image display device 2 determines whether initial settings, such as registration of account information, are already made before the service is used. When the initial settings are not made yet (A3: NO), the image display device 2 displays, for example, a registration guide screen for the user to input account information (A5).

As is depicted in FIG. 4, when the initial settings are already made and the selected service is available (A3: YES), the image display device 2 provides the service by acquiring contents from the content server 6 via the portable communication terminal 3 according to an operation by the user (A4). The image display device 2 continues to provide the service until the user gives an instruction to end the service being provided (A6: NO). Meanwhile, the image display device 2 ends the processing when the user gives an end instruction (A6: YES).

In this manner, the image display device 2 provides the service selected by the user.

An operation of the image display device 2 when the user selects the photo information providing service described above will now be described with reference to FIG. 6 through FIG. 13.

Figure 6:
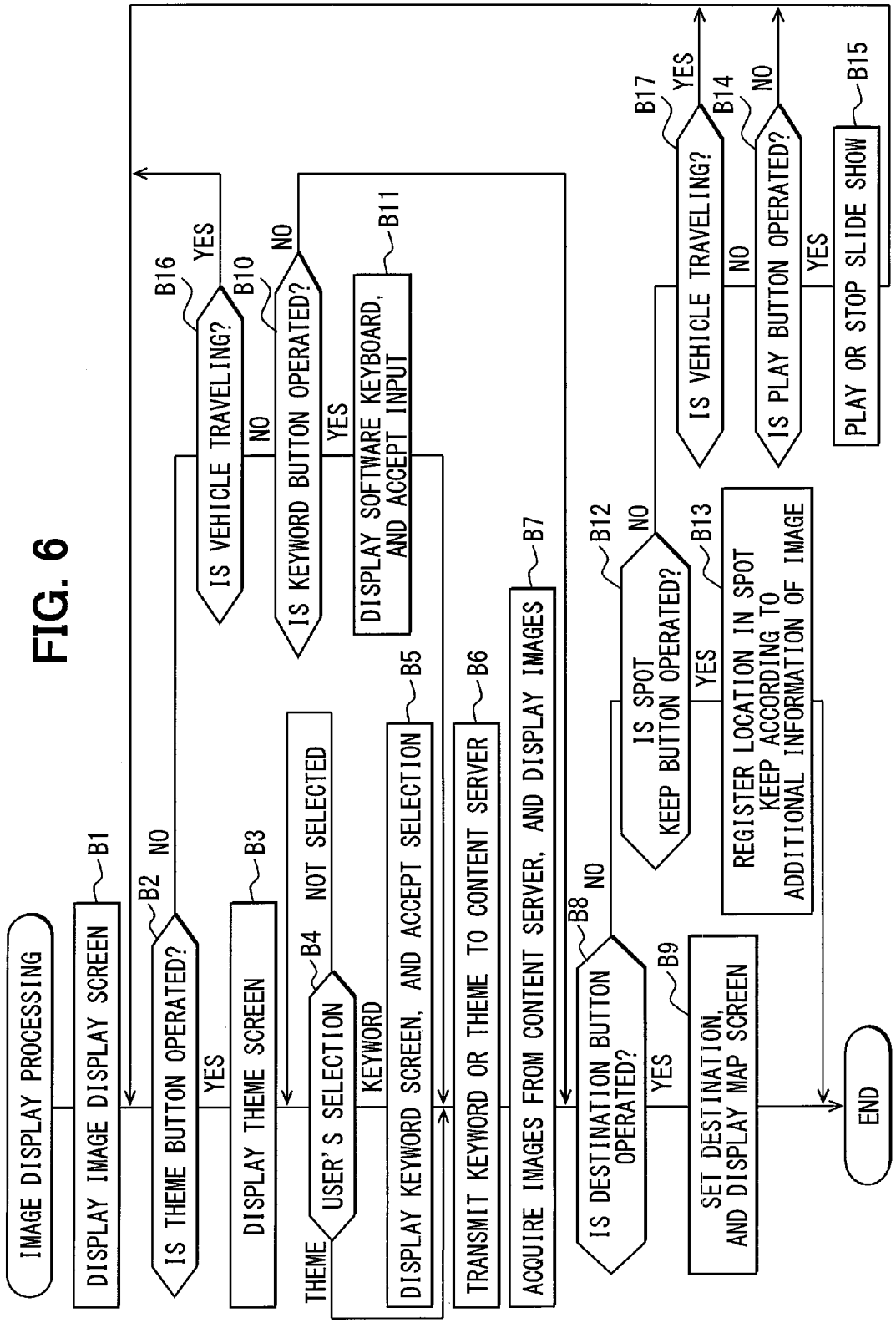
FIG. 6 is a chart depicting a flow of image display processing by the image display device.

The image display device 2 performs image display processing depicted in FIG. 6. Hence, when the icon I3 corresponding to the photo information providing service (for example, the service C shown in FIG. 5) is operated, the image display device 2 displays an image display screen shown in FIG. 7 (B1). When the user performs an end operation or a start operation of another application while the image display device 2 is performing the image display processing depicted in FIG. 7, the image display device 2 ends the image display processing. The image display screen shown in FIG. 7 displays an image acquired last time and a title given to the image ("Mt. Fuji" in FIG. 7) by ways of example. Alternatively, it may be configured in such a manner so as to display a sample image pre-stored in the vehicle-side storage portion 15 at a startup of the photo information providing service. The image display screen also displays a theme button M1, a keyword button M2, a destination button M3, a spot keep button M4, a play button M5, and a favorite button M6.

The theme button M1 is a button to input a selection operation to select a theme by which images stored in the content server 6 are filtered in the content server 6. The term, "theme", referred to herein means keywords preliminarily set for the images, for example, titles or tags set for the images or categories managed in the content server 6, that is, information specifying types of images. The keyword button M2 is a button via which the user inputs an arbitrary keyword. The keyword thus inputted is used as a keyword to filter images in the content server 6. The theme or the keyword corresponds to a refinement condition.

The destination button M3 is a button to set a location specified by an image being displayed as a destination of the vehicle in the navigation function. The spot keep button M4 is a button to store a location specified in the image being displayed as so-called a favorite spot. The destination button M3 and the spot keep button M4 are displayed when the image being displayed is appended with additional information capable of specifying a location related to the image, that is, when the additional information is correlated with the image and stored in the content server 6. In other words, an image displayed with the destination button M3 and the spot keep button M4 is an image capable of specifying a location specified by a content of the image and a location at which the image was taken. The location specified by a content of the image means, for example, in the case of an image of Mt. Fuji, a location of Mt. Fuji shown in the image and not a location at which the image was taken.

The additional information includes, for example, a category of a content of an image, a keyword set for the image, a name of the content of the image, a user identification name of a provider of the image, a title set for the image, a shooting date when the image was taken, and a registration date when the image was registered. The additional information capable of specifying a location contains a location of the content of the image, a location of a provider of the content of the image, and a shooting location at which the image was taken. More specifically, a location of the content of the image can be "attachment information on GPS"

(so-called geo-tag) in compliance with the Exif (Exchangeable image file format) standards, which is information containing a latitude and a longitude chiefly appended to photo data. A method of appending the geo-tag to an image includes (a) a method of appending the geo-tag when an image is taken by using a digital camera equipped with a GPS or a camera-equipped cell-phone, (b) a method of recording a travelled route in a lone GPS receiver and adding later location information of the GPS receiver corresponding to a shooting time when the image was taken using special software on a personal computer, (c) a method of adding location information to each image later by manually specifying the spot on the map using special software or a Web service, and so on.

The play button M5 is a button to input an operation to play and stop a slide show that displays a plurality of acquired images by sequentially switching the images one by one. The favorite button M6 is a button to display information on a spot registered in Spot Keep, that is, so-called a favorite spot.

When the image display screen is displayed, the image display device 2 determines in the image display processing depicted in FIG. 6 whether the theme button M1 is operated (B2) and whether the vehicle is traveling (B16). As has been described above, the image display device 2 acquires the vehicle information capable of determining whether the vehicle is traveling from the ECU 7 by means of the vehicle information acquisition portion 17. Upon determining that the vehicle is traveling (B16: YES), the image display device 2 does not input the keyword (Step B10), which will be described below. In other words, the image display device 2 puts a traveling restriction into effect, by which an operation on the keyword button M2 is restricted. Owing to this restriction, the image display device 2 secures safety while the vehicle is travelling. In this case, the image display device 2 may put the traveling restriction into effect by withholding from displaying the keyword button M2 (restricting the display) or lowering the tone. The user can input a keyword, that is, the refinement condition when the traveling restriction is not in effect.

The processing when images are acquired will be described first and then the processing to set a destination will be described.

Figure 7:
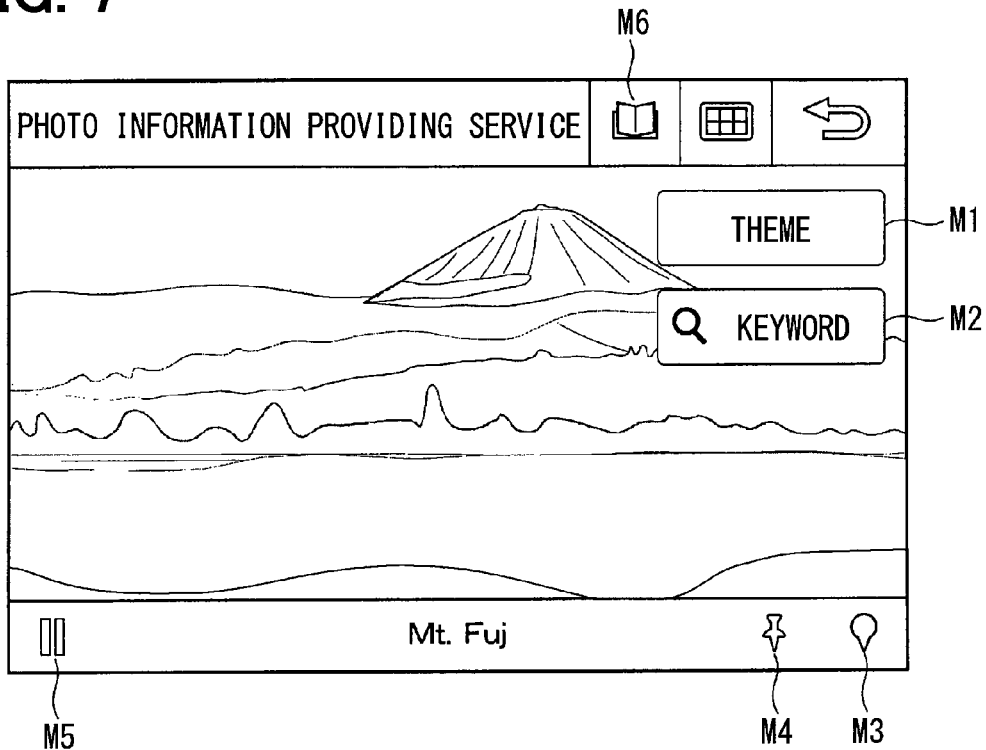
FIG. 7 is a diagram showing an example of an image display screen on the image display device.

When the user operates the theme button M1 on the image display screen shown in FIG. 7, because the theme button M1 is operated (B2: YES) in the image display processing depicted in FIG. 6, the image display device 2 displays a theme screen shown in FIG. 8 (B3). In this theme screen, themes that can be set as a keyword, for example, "car", "spring", "summer", "autumn", and "winter", are preliminarily set. In addition, "recently used keywords" showing a history of keywords the user recently used is displayed on the theme screen. Types and the number of the themes are not limited to those specified above and the user can select other themes by scrolling down the screen using a scroll bar M7. An operation on the scroll bar M7 is, however, subject to the traveling restriction described above.

Figure 8:
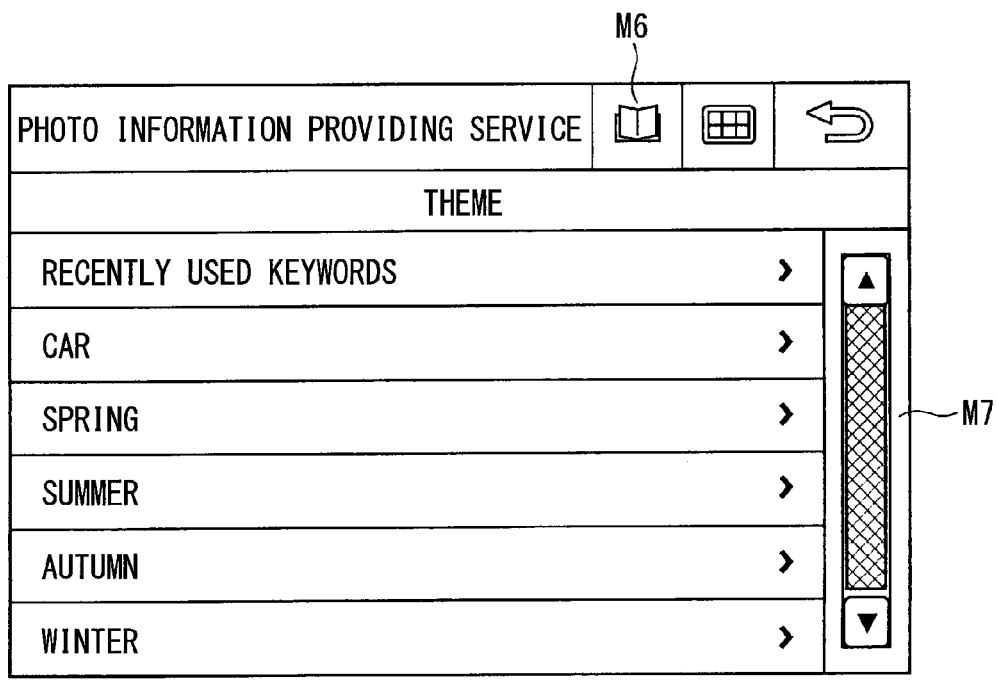
FIG. 8 is a diagram showing an example of a theme selection screen on the image display device.

When the user selects any one of the themes on the theme screen shown in FIG. 8, more specifically, when the user touches a region where a type of the theme (for example, "car") is displayed, because the theme is selected (B4: theme) in the image display processing depicted in FIG. 6, the image display device 2 transmits the selected theme to the content server 6 (B6).

Figure 9:
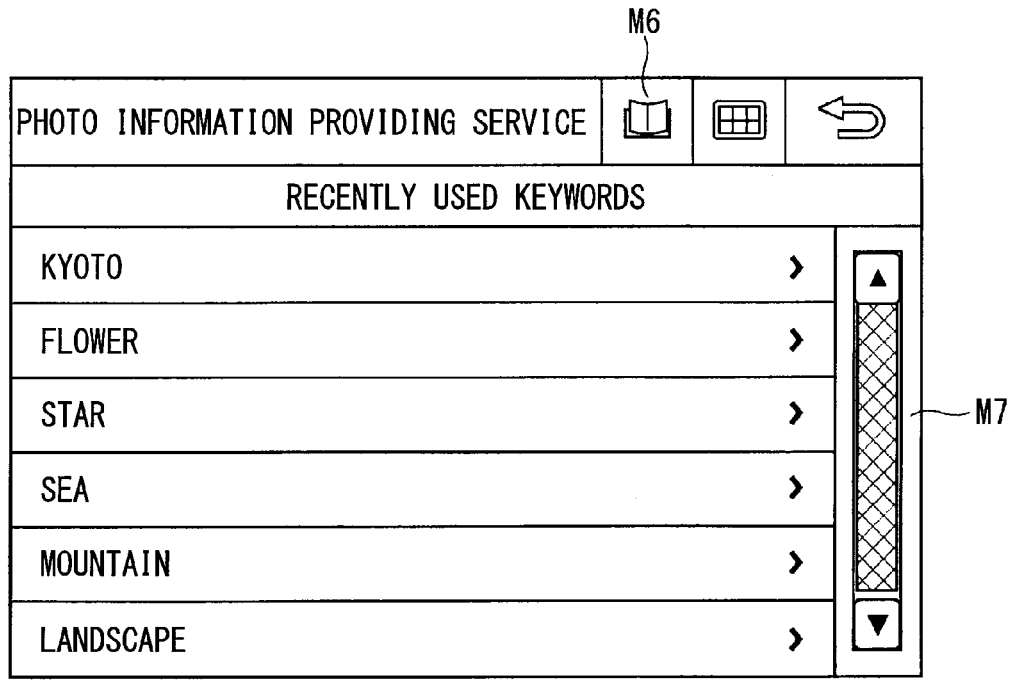
FIG. 9 is a diagram showing an example of a history search screen on the image display device.

On the other hand, when the user selects "recently used keywords" on the theme screen shown in FIG. 8, because the keyword is selected (B4: keyword) in the image display processing depicted in FIG. 6, the image display device 2 displays a keyword screen shown in FIG. 9 and also accepts a selection of the keyword (B5). At Step B5, the user selects any one of the keywords being displayed (for example, "Kyoto", "flower", "star", and so on in FIG. 9) instead of inputting a keyword. The image display device 2 transmits the selected keyword to the content server 6 (B6). More specifically, in this embodiment, the image display device 2 transmits the keyword to the portable communication terminal 3 and makes the portable communication terminal 3 perform processing to transmit the keyword to the content server 6. Also, as will be described below, images acquired by the portable communication terminal 3 are displayed on the image display device 2.

When the user operates the keyword button M2 on the image display screen shown in FIG. 7, because the keyword button M2 is operated (B10: YES) in the image display processing depicted in FIG. 6, the image display device 2 displays a software keyboard and also accepts an input of the keyword (B11). In this case, the user inputs an arbitrary keyword. It should be noted, however, that as has been described above, an input of the keyword is subject to the travelling restriction. When the keyword is inputted, the image display device 2 transmits the keyword inputted therein to the content server 6 (B6).

Figure 10:
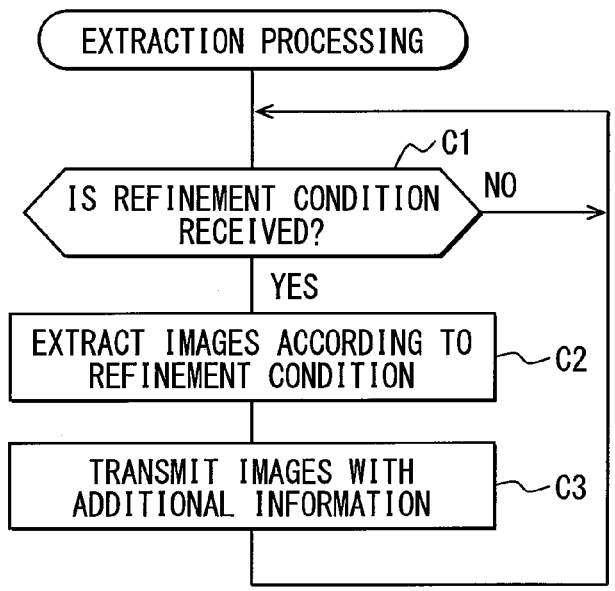
FIG. 10 is a chart depicting a flow of extraction processing by a content server.

The content server 6 repetitively performs extraction processing depicted in FIG. 10 and determines whether the refinement condition is received, that is, whether the theme or the keyword selected by the user is received (C1). Upon receipt of the refinement condition (C1: YES), the content server 6 extracts images that match the refinement condition among the images stored in the storage portion 61 according to the received refinement condition (C2). The content server 6 subsequently transmits the extracted images appended with the additional information to the mobile terminal (C3). In this manner, the content server 6 (or the intermediate server 5) filters a large number of images stored therein according to the refinement condition.

When the images are transmitted from the content server 6, the image display device 2 displays acquired images (B7) in the image display processing depicted in FIG. 6. More specifically, when the image display device 2 acquires the images, the image display device 2 displays a list display screen as shown in FIG. 10. FIG. 10 shows an example when "landscape" is selected as the keyword in FIG. 9. The list display screen displays reduced display portions M8 displaying thumbnails (reduced displays) of images, title display portions M9 displaying titles and names of posters (user identification names) as additional information appended to the images, and a slide-show button M10 to display the acquired images like a slide show. In this case, when the photo information providing service is performed, for example, by more than one SNS, the image display device 2 can acquire images collectively by registering account information of more than one SNS. It goes without saying that the image display device 2 can acquire images by specifying a single SNS.

For images appended with additional information capable of specifying locations, the list display screen also displays the destination button M3 and the spot keep button M4 correspondingly. Hence, as will be described below, the user can set a destination or register a location in Spot Keep.

Figure 11:
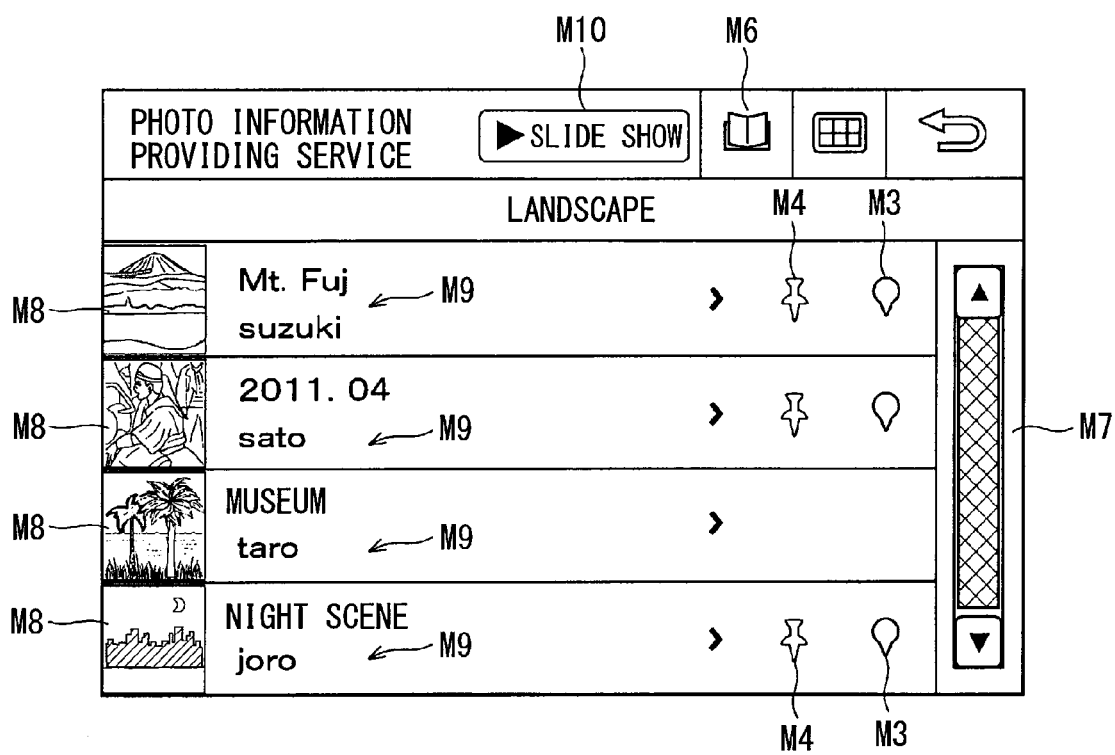
FIG. 11 is a diagram showing an example of a history search result screen on the image display device.

When the user selects any one of the images, for example, the image under the title of "night view", the image display device 2 displays the selected image, for example, as shown in FIG. 11. Alternatively, when the user operates the slide-show button M10, the image display device 2 displays the acquired images successively like a slide show. It should be noted, however, that an operation on the slide-show button M10 is subject to the travelling restriction and an operation is restricted when the traveling restriction is in effect.

In this manner, the image display device 2 acquires images according to a theme or a keyword selected by the user, in other words, images filtered to those the user is interested in, among the images stored in the content server 6 and displays the acquired images.

A procedure to set a destination on the basis of the acquired images will now be described.

Figure 12:
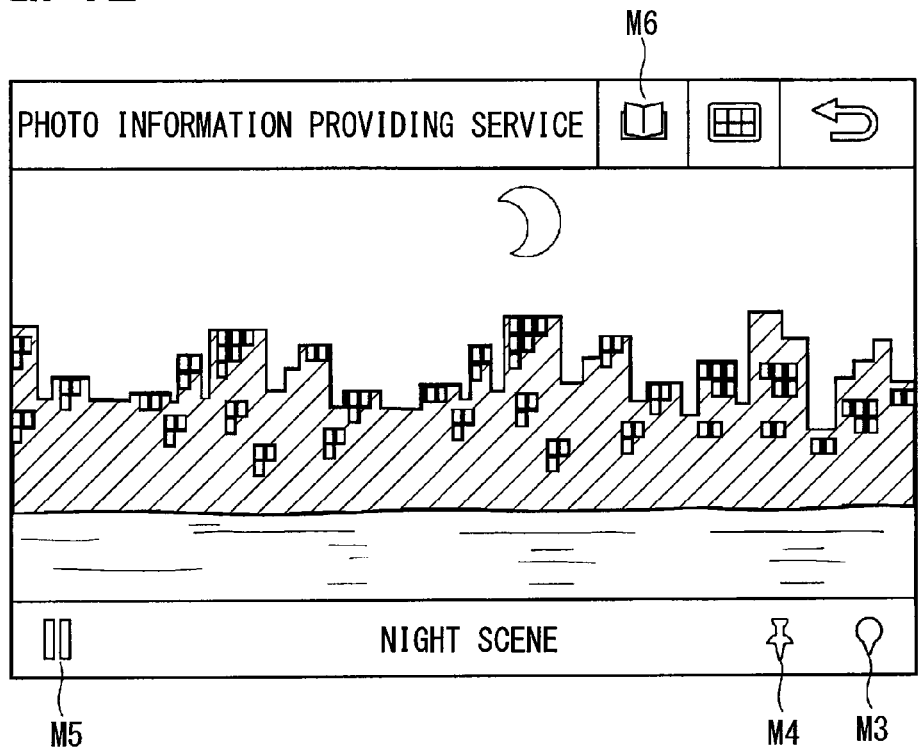
FIG. 12 is a diagram showing an example of a list display screen on the image display device.
Figure 13:
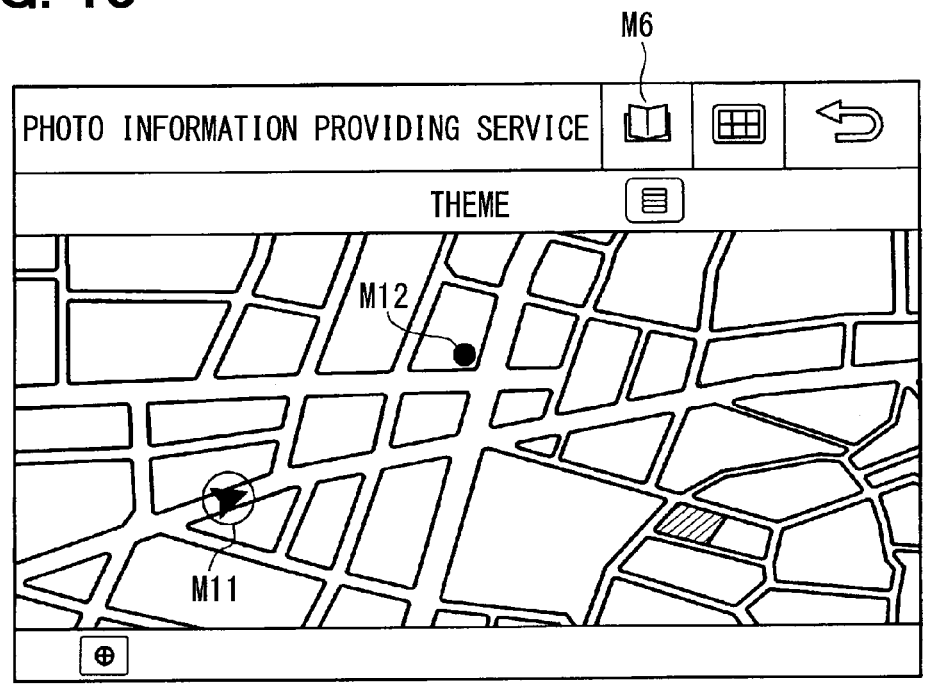
FIG. 13 is a diagram showing an example of a map setting screen on the image display device.

When the destination button M3 is operated (B8: YES) in the image display processing depicted in FIG. 6, the image display device 2 displaying the image specifies a location related to the image according to the additional information described above. The image display device 2 subsequently sets the specified location as the destination and displays a map screen displaying a map near the destination as shown in FIG. 12 (B9). This map screen displays an own vehicle location M11 and a destination location M12 as with a known navigation function. The image display device 2 searches for a route to the destination and also performs the navigation function to guide the vehicle to the destination. In this embodiment, it is configured in such a manner that the image display device 2 is also furnished with the navigation function. However, in a case where a navigation device is provided separately from the image display device 2, it may be configured in such a manner that the image display device 2 transmits information on the destination to the navigation device to let the navigation device guide the route.

In this manner, the image display device 2 can set the destination on the basis of the image selected by the user, to be more exact, according to the additional image appended to the image. In other words, the image display device 2 does not search for images after the location of a destination is set, but sets the image selected by the user as the destination. Owing to this configuration, the image display device 2 can readily set a landscape or a facility the user wishes to visit among the images stored in the content server 6 as the destination.

When the spot keep button M4 is operated by the user (B12: YES), the image display device 2 registers the location related to the image in Spot Keep according to the additional information described above (B13). Besides the location, the image and other additional information may be stored as information on a favorite spot. When configured in this manner, the user can have the image of his favorite spot be displayed and set the location thereof as the destination whenever he chooses by operating the favorite button M6 and reading out the information on the favorite spot.

Although the image display device 2 is capable of displaying the images like a slide show as described above, the image display device 2 does not accept an operation on the play button M5 while the vehicle is travelling (B17: YES). That is, the play button M5 is subject to the travelling restriction. On the other hand, the image display device 2 accepts an operation on the play button M5 by the user (B14: YES) unless the vehicle is not traveling (B17: NO) and plays a slide show or stops a slide show when the slide show is being played and displays a last image (B15).

In this manner, the image display device 2 acquires images and sets a destination on the basis of the acquired images.

This embodiment described as above can achieve advantages as follows.

In the image display system 1, the refinement condition specifying a type of images specified by the user is transmitted from the image display device 2 to the content server 6. In response, the content server 6 extracts a plurality of images that match the refinement condition according to the refinement condition transmitted from the image display device 2 and transmits the extracted images to the image display device 2. The image display device 2 subsequently displays the images acquired from the content server 6 on the vehicle-side display portion 11 and sets a location related to an image selected by the user as the destination. In other words, in the image display system 1, images the user wishes to view are extracted (filtered) first and a location related to an image selected among the images filtered in response to user's interest is set as the destination. Hence, the image display system 1 does not fail to include images the user wishes to view in the filtered images, so that the user can filter images to those he wishes to view without having to specify a particular spot and determine a destination he wishes to visit among these images.

The content server 6 stores at least one of a category of a content of an image, a keyword set for the image, a name of the content of the image, a user identification name of a provider of the image, a title set for the image, a shooting date when the image was taken, and a registration date when the image was registered in connection with the image as the additional information. The image display device 2 sets the destination according to the additional information. Accordingly, the convenience is enhanced because the user no longer has to check where the image was taken. In addition, the user can quickly search for not only a type of images he is interested in, but also images shared, for example, by friends or by groups.

In the image display system 1, the image display device 2 can distinguish images appended with the additional information from images not appended with the additional information among the acquired images depending on whether the destination button M3 and the spot keep button M4 are present or not. This configuration enables the user to understand immediately which image cannot be set as a destination.

In the image display system 1, because a plurality of acquired images are displayed in a list format and/or a slide-show format, the user can readily understand what images are present. In this instance, by displaying the images like a slide show, the images can be used, for example, as so-called a BGV (Back Ground Video) or a promotion video corresponding to a particular keyword.

In the image display system 1, categories according to which images are managed in the content server 6, keywords specified by the user, names of facilities, names of spots, names of users who posted images, and titles set by the users who posted images are set as themes. This configuration enables the user to filter images not only to those he is interested in, but also to filter images by friends or groups.

In the image display system 1, because a plurality of acquired images are displayed in a list format and/or a slide-show format, the user can readily understand what images are present. In this instance, by displaying the images like a slide show, the images can be used, for example, as so-called a BGV (Back Ground Video) or a promotion video corresponding to a particular keyword.

In the image display system 1, the image display device 2 is applied to a vehicle device. Hence, upon determining that the vehicle is traveling on the basis of vehicle information capable of specifying a traveling state of the vehicle, the image display device 2 restricts part of displays on the vehicle-side display device 11 and inputs of operations on the vehicle-side operation input portion 12. Owing to this configuration, safety while the vehicle is traveling can be ensured, for example, by withholding the driver from fixing his eyes on the screen while the vehicle is traveling. The driver can thus drive the vehicle comfortably.

Second Embodiment

Hereinafter, a second embodiment of the present disclosure will be described with reference to FIG. 14 through FIG. 16. The second embodiment is different from the first embodiment above in that images to be displayed are sorted. Because configurations of an image display system, an image display device, and a portable communication terminal are common with counterparts in the first embodiment above, a detailed description is omitted herein.

Figure 14:
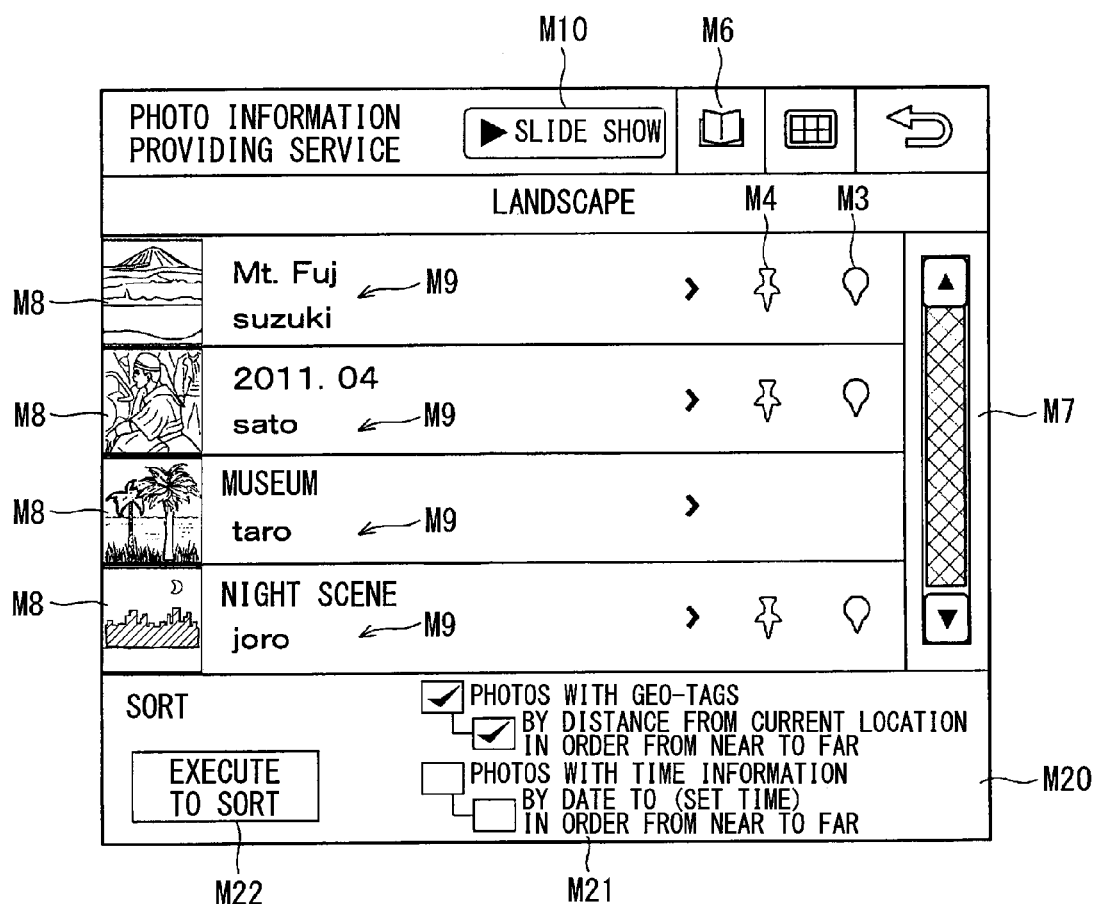
FIG. 14 is a diagram showing an example of a theme selection screen on an image display device of a second embodiment disclosed herein.

As is shown in FIG. 14, an image display device 2 of the second embodiment is capable of sorting images being displayed. As has been described above, the image display device 2 displays images appended with additional information capable of specifying locations together with a destination button M3 and a spot keep button M4. In other words, because locations of images that are displayed without the destination button M3 and the spot keep button M4 cannot be specified, these images cannot be set as a destination. Accordingly, when the image display device 2 displays a plurality of acquired images in a list format, the image display device 2 can change an order in which the images are displayed.

The image display device 2 displays a condition display area M20 for the user to input a sort condition. The image display device 2 sorts the images according to the sort condition inputted therein from the condition display area M20.

For example, when the user wishes to sort the images in order of "photos with geo-tags (images attached with geo-tags as additional information), the user marks a corresponding checkbox by a touching operation. When the user wishes to have the images be displayed in order of nearness from the current location, the user marks a checkbox corresponding to "by distance from current location: near to far". In this case, the sort condition is to sort the photos with geo-tags in order of nearness from the current location.

Alternatively, when the user wishes to sort images according to time information, the user marks a checkbox corresponding to "photos with time information" and "by date to (set date): near to far". Although it is not shown in the drawing, a more detailed date setting screen is displayed when the user touches a set date button M21.

When the sort condition is inputted and a sort button M22 is operated by a touching operation of the user, the image display device 2 sorts the images according to the sort condition and displays the sorted images. Consequently, for example, images with geo-tags are displayed in a list format in order of nearness from the current location. In short, images that can be set as a destination are display at higher ranks in the list. Hence, when the user sets a destination by selecting an image, images that the user wishes to view are displayed at higher ranks in the list. The convenience can be thus enhanced.

In the case described above, the images are sorted on the side of the image display device 2. However, when a large number of images are present, a load on the side of the image display device 2 is increased. To eliminate this inconvenience, the image display device 2 is configured in such a manner that images that do not match the sort condition can be omitted at the time of search.

Figure 15:
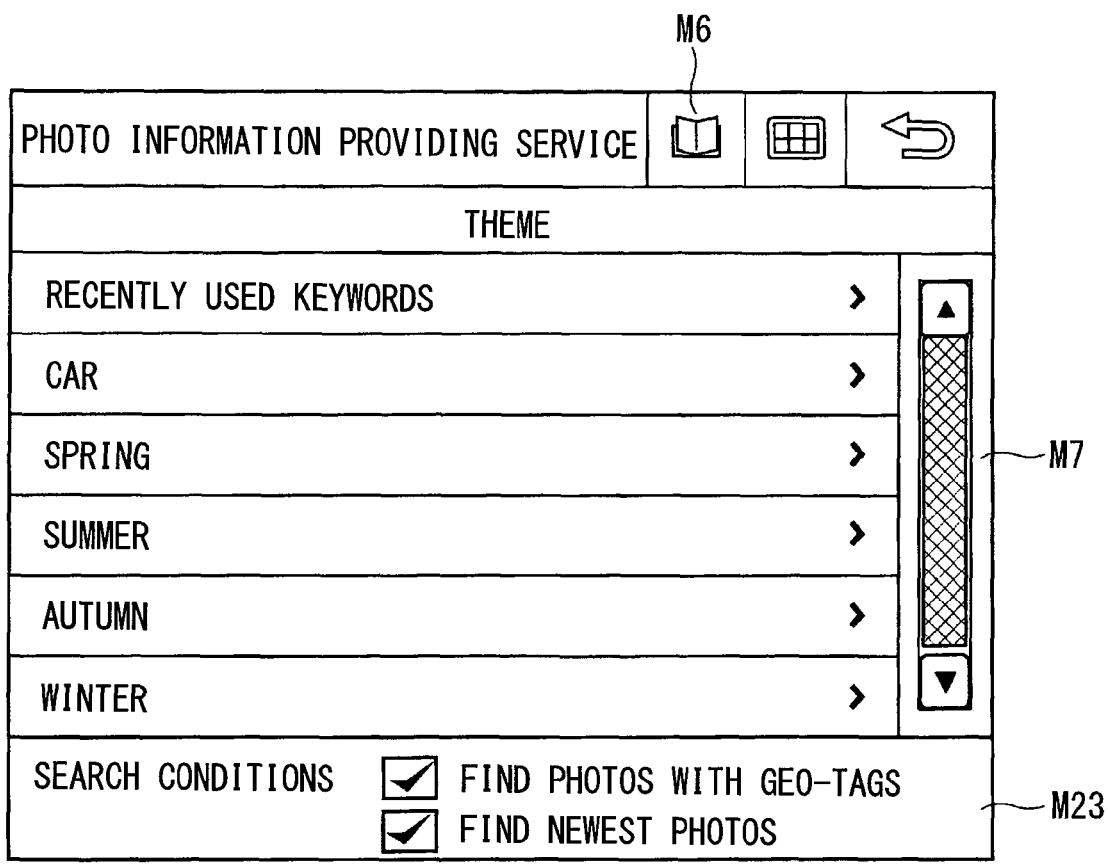
FIG. 15 is a diagram showing an example of a search screen on the image display device.

More specifically, as is shown in FIG. 15, the image display device 2 displays a condition display area M23 that displays search conditions, such as "find photos with geo-tags" and "find newest photos". The image display device 2 requests the user to set the search condition(s) when a search by category is performed, and transmits the search condition(s) to the content server 6 together with the category. The content server 6 thus becomes able to extract only images that match the sort condition. In this case, for example, because images without geo-tags are not acquired from the start, a processing load during the sorting can be lessened. The research condition(s) corresponds to the refinement condition.

Figure 16:
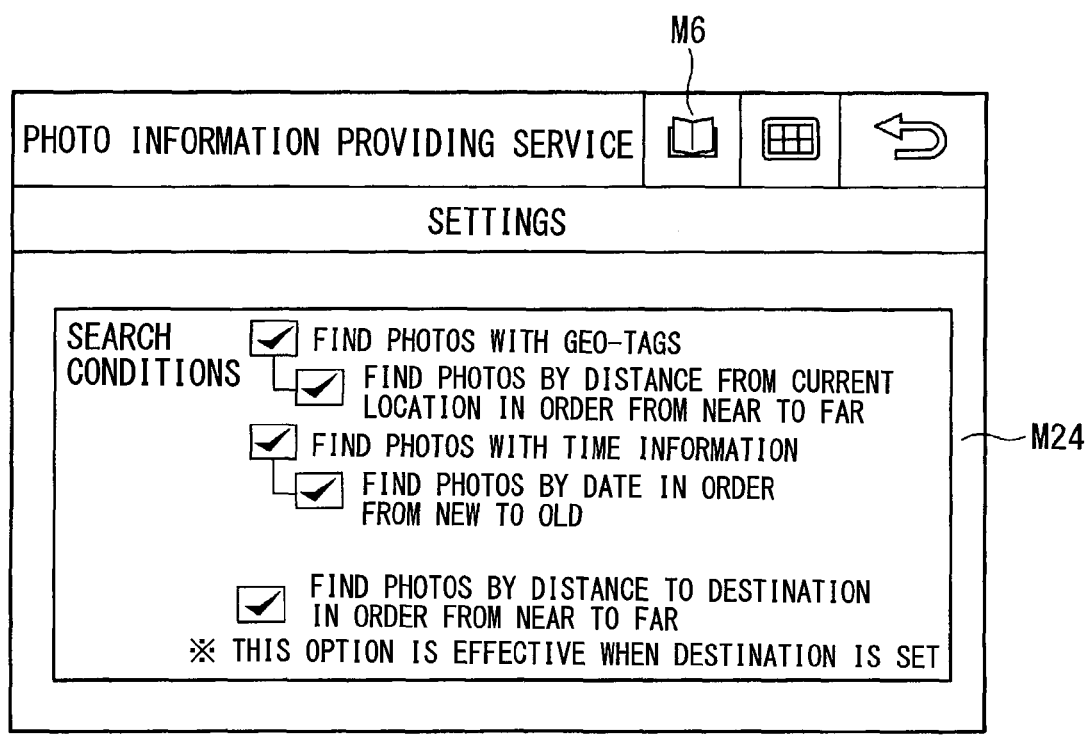
FIG. 16 is a diagram showing an example of a setting screen on the image display device.

Also, as is shown in FIG. 16, the image display device 2 may be provided with a separate setting screen to set "find photos with geo-tags" and "find newest photos" more in detail. Further, other search conditions, for example, a search condition, in order of nearness to the set destination instead of in order of nearness from the current location, can be added.

It should be appreciated that the search conditions specified above are a mere example and other search conditions can be set as well. Further, the search conditions can be combined arbitrarily. For example, when "images with geo-tags" is included in the search conditions, other search conditions, such as "omit foreign images" and "omit places inaccessible by car", may be combined with the search conditions.

As has been described, by setting the sort condition to the search conditions and preliminarily omitting unwanted images, a processing load on the image display device 2 and the portable communication terminal 3 can be lessened. In addition, because unwanted images are omitted, a volume of communication data can be reduced and communication fees can be therefore saved in the case of a communication charge by a pay-as-you-go system.

Other Embodiments

The first embodiment above described a case where the mobile device is formed of the image processing device and the portable communication terminal 3. However, the mobile terminal may be formed of the portable communication terminal 3 alone. In this case, it may be configured as follows. That is, the refinement condition same as the one used in the first embodiment above is inputted from the terminal-side operation input portion 22 of the portable communication terminal 3 and the refinement condition is transmitted to the content server 6. The images are extracted on the side of the content server 6 and the acquired images are displayed on the terminal-side display portion 21. The portable communication terminal 3 sets a location related to a single selected image as the destination. The destination set by the portable communication terminal 3 is transmitted to the image display device 2 via BT communications so that the image display device 2 performs the navigation function described above. It goes without saying that the portable communication terminal 3 performs the navigation function to the destination set by the portable communication terminal 3. Further, it may be configured in such a manner that information on the set destination is transmitted to an outside server furnished with the navigation function to let the outside server perform the navigation function. In this case, the portable communication terminal 3 only displays images. The point is that the mobile terminal disclosed herein is not limited to a vehicle device.

The content servers 6 from which images are acquired may be changed depending on the refinement condition. For example, assume that a content provider A includes a database of images specialized for cooking and a content provider B includes a database of images specialized for scenery images. Then, the mobile terminal switches the content servers 6 from which images are acquired depending on the refinement condition, for example, by acquiring images from the content provider A or acquiring images from the content provided B depending on a content of the refinement condition, such as a theme and a keyword. When the intermediate server 5 is provided, it may be configured in such a manner that the intermediate server 5 switches the content servers 6 from which images are acquired depending on the refinement condition transmitted from the mobile terminal. When configured in this manner, more images or more specialized images can be acquired at a higher probability.

A distance from the current location and an expected time of arrival from the current location may also be set as the refinement condition. In this case, the current location is transmitted from the mobile terminal to the content server 6 in addition to the refinement condition, so that the content server 6 extracts the obtained current location and images that match the refinement condition. In this case, the server extracts images that match the refinement condition by comparing the additional information appended to images stored therein and the received current location and calculating a distance from the current position or calculating an expected time of arrival from the current location to a location specified by the image. When the mobile terminal is the image display device 2 (that is, vehicle device), the content server 6 can calculate an expected time of arrival on the basis of a vehicle speed. When the mobile terminal is the portable communication terminal 3, the content server 6 can calculate an expected time of arrival by foot or by public transport. For example, suppose that the user uses the image display device 2 when he goes for a walk or a drive. Then, even when the image display device 2 displays an image of a location (for example, foreign country) far from the current location, the user may not be able to move to such a location. Hence, by adding a distance from the current location to the refinement condition, images can be filtered to those at locations within a movable range of the user. The availability is thus enhanced. In this case, a pre-set range in reference to a destination when the navigation function is used or a route to the destination may be set.

In the first embodiment above, it is configured in such a manner that the content server 6 extracts images that match the refinement condition regardless of whether the additional information is appended or not. However, it may be configured in such a manner that the content server 6 does not extract images not appended with the additional information. When configured in this manner, images for which locations related to the images are difficult to specify, that is, images that are difficult to set as a destination can be omitted from images to be extracted.

In the second embodiment above, the image display device 2 sorts images. However, the portable communication terminal 3 operating in cooperation with the image display device 2 may sort images and the display device 2 may display the result. Also, it may be configured in such a manner that the sort condition is transmitted to the content server 6 so that the images are sorted on the side of the content server 6 and the image display device 2 acquires the sorted images. When configured in this manner, additional processing in the image display device 2 and the portable communication terminal 3 can be lessened further.

The image display device 2 may operate in cooperation with the portable communication terminal 3, so that, for example, images acquired on the side of the portable communication terminal 3 are transferred to the image display device 2 or images acquired in the image display device 2 are transferred to the portable communication terminal 3. This configuration is useful, for example, in a case where the user moves to the destination by car and moves from the destination by foot and in a case where the owner of the portable communication terminal 3 rents a car.

The respective embodiments above have described that Bluetooth (registered trademark) is adopted as a communication system between the image display device 2 and the portable communication terminal 3. However, the communication system is not limited to Bluetooth (registered trademark). For example, other wireless communication systems, such as a wireless LAN so-called Wifi and a wireless USB that is a wireless version of USB, may be adopted as well, or wire communication systems such as a USB may be adopted as well.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An image display system comprising:
   a server having a storage device that stores a plurality of images; and
   a mobile terminal installed in a vehicle and having a display device that displays the plurality of images acquired from the server,
   wherein the mobile terminal includes:
   an operation input device that performs an operation to input a refinement condition according to a theme or a keyword selected by a user for specifying an image type desired by the user without being specified by a location and an operation to select at least one of the plurality of images displayed on the display device based on the image type; and
   a control device that sets a related location related to the at least one of the plurality of images selected by the operation input device as a destination for a navigation function,
   wherein the storage device stores for each image: additional information to specify at least one of a location of the image, a location of a provider of the image, and a shooting location of the image; and other information not connected with the additional information,
   wherein the server includes an extraction device that extracts the at least one of the plurality of images based on the additional information and the other information not connected with the additional information according to the refinement condition obtained from the mobile terminal,
   wherein the display device displays the plurality of images in at least one of a list format to display two or more of the plurality of images concurrently and a slide-show format to display one of the plurality of images by sequentially switching the plurality of images in such a manner that the additional information and the other information not connected with the additional information are distinguishable based on whether navigation to the related location is provided,
   wherein the display device displays a destination button only when an image displayed on the display device is appended with the additional information specifying at least one of the location of the image, the location of the provider of the image and the shooting location of the image, wherein, in response to the destination button being operated by the user, the control devices sets the related location from the additional information of the image as the destination for the navigation function, and wherein the display device includes a vehicle-side control portion that provides navigation guidance for the navigation function to guide the vehicle to the destination.

2. The image display system according to claim 1,
wherein the storage device stores for each image, at least one of a category of the image, a keyword for the image, a name of the image, a user identification name of a provider of the image, a title set for the image, a shooting date when the image was taken, and a registration date when the image was registered; and
wherein the operation input device performs an operation to input, as the refinement condition, at least one of the category, the keyword, the name, the user identification name, the title, the shooting date, and the registration date.

3. The image display system according to claim 1,
wherein the server has a first server and a second server; and
wherein the control device acquires the plurality of images from the first server or the second server depending on the refinement condition.

4. The image display system according to claim 1,
wherein the control device acquires the additional information when the control device acquires the plurality of images, and specifies a location related to each of the plurality of images according to the additional information acquired together with the other information.

5. The image display system according to claim 4,
wherein the mobile terminal further includes a current location acquisition device that acquires a current location of the mobile terminal;
wherein the operation input device performs an operation to input, as the refinement condition, a distance from the current location acquired by the current location acquisition device to the location related to each of the plurality of images or an expected time of arrival from the current location to the location related to each of the plurality of images; and
wherein the extraction device specifies a location related to the additional information, and extracts the plurality of images according to the refinement condition.

6. The image display system according to claim 4,
wherein the control device performs a navigation function to provide a guidance on a route to the destination or utilizes the navigation function provided from an outside device;
wherein the operation input device performs an operation to input a predetermined range in reference to the destination or a route to the destination as the refinement condition; and
wherein the extraction device specifies a location related to each of the additional information, and extracts the plurality of images according to the refinement condition.

7. The image display system according to claim 1,
wherein the mobile terminal is a vehicle mobile terminal;
wherein the image display system further includes a vehicle information acquisition device that acquires vehicle information for specifying a traveling state of a vehicle; and
wherein the control device restricts at least a part of an input operation on the operation input device or a display operation by the display device when the control device determines based on the vehicle information that the vehicle is travelling.

8. The image display system according to claim 1,
wherein the mobile terminal is a vehicle mobile terminal; and
wherein the control device executes an application that functions in cooperation with a portable communication terminal, and acquires the plurality of images from the server via the portable communication terminal.

9. The image display system according to claim 1,
wherein the operation input device performs an operation to input a sort condition, according to which a part of the images among the plurality of images to be displayed on the display device are sorted; and
wherein the mobile terminal sorts the part of the images to be displayed on the display device according to the sort condition inputted from the operation input device, and displays the part of the images, which are sorted, on the display device.

10. The image display system according to claim 1,
wherein the operation input device performs an operation to input a sort condition, according to which a part of the plurality of images to be displayed on the display device are sorted;
wherein the mobile terminal transmits the sort condition inputted from the operation input device to the server; and
wherein the server transmits the part of the plurality of images, which are extracted according to the refinement condition, to the mobile terminal in a state where the plurality of images are preliminarily sorted according to the sort condition.

11. The image display system according to claim 1,
wherein the shooting location, the location of the image, and the location of the provider of the image are geographical locations.

12. A mobile terminal comprising:
a display device that displays a plurality of images acquired from a server, the server having a storage device that stores the plurality of images;
an operation input device that performs an operation to input a refinement condition according to a theme or a keyword selected by a user for specifying an image type desired by the user without being specified by a location and an operation to select at least one of the plurality of images displayed on the display device based on the image type; and
a control device that sets a related location related to the at least one of the plurality of images selected by the operation input device as a destination for a navigation function,
wherein the storage device stores for each image: additional information to specify at least one of a location of the image, a location of a provider of the image, and a shooting location of the image; and other information not connected with the additional information,
wherein the server includes an extraction device that extracts the at least one of the plurality of images based on the additional information and the other information not connected with the additional information according to the refinement condition obtained from the mobile terminal,
wherein the display device displays the plurality of images in at least one of a list format to display two or more of the plurality of images concurrently and a slide-show format to display one of the plurality of images by sequentially switching the plurality of images in such a manner that the additional information and the other information not connected with the additional information are distinguishable based on whether navigation to the related location is provided, wherein the display device displays a destination button only when an image displayed on the display device is appended with the additional information specifying at least one of the location of the image, the location of the provider of the image and the shooting location of the image, wherein, in response to the destination button being operated by the user, the control devices sets the related location from the additional information of the image as the destination for the navigation function, and wherein the display device includes a vehicle-side control portion that provides navigation guidance for the navigation function to guide a vehicle to the destination.

13. A server comprising:

a storage device that stores a plurality of images; and an extraction device, wherein the storage device stores for each image: additional information to specify at least one of a location of the image, a location of a provider of the image, and a shooting location of the image; and other information not connected with the additional information, wherein the extraction device extracts the at least one of the plurality of images based on the additional information and the other information not connected with the additional information according to a refinement condition obtained from a mobile terminal installed in a vehicle, and wherein the mobile terminal includes:
- a display device that displays one or more of the plurality of images acquired from the server;
- an operation input device that performs an operation to input the refinement condition according to a theme or a keyword selected by a user for specifying an image type desired by the user without being specified by a location and an operation to select at least one of the plurality of images displayed on the display device based on the image type;
- a control device that sets a related location related to the at least one of the plurality of images selected by the operation input device as a destination for a navigation function, and wherein the display device displays the plurality of images in at least one of a list format to display two or more of the plurality of images concurrently and a slide-show format to display one of the plurality of images by sequentially switching the plurality of images in such a manner that the additional information and the other information not connected with the additional information are distinguishable based on whether navigation to the related location is provided, wherein the display device displays a destination button only when an image displayed on the display device is appended with the additional information specifying at least one of the location of the image, the location of the provider of the image and the shooting location of the image, wherein, in response to the destination button being operated by the user, the control devices sets the related location from the additional information of the image as the destination for the navigation function, and wherein the display device includes a vehicle-side control portion that provides navigation guidance for the navigation function to guide the vehicle to the destination.

14. A non-transitory physical computer-readable medium comprising instructions being executed by a computer, the instructions including a computer-implemented method for displaying images, the instructions including:

storing a plurality of images in a storage device of a server, each of the plurality of images including: additional information to specify at least one of a location of the image, a location of a provider of the image, and a shooting location of the image; and other information not connected with the additional information;

displaying the plurality of images acquired from the server on a display device in a mobile terminal installed in a vehicle;

inputting a refinement condition according to a theme or a keyword selected by a user for specifying an image type desired by the user without being specified by a location in the mobile terminal, and selecting at least one of the plurality of images displayed on the display device based upon the image type;

setting a related location related to selected at least one of the plurality of images as a destination for a navigation function;

extracting the at least one of the plurality of images in the server based upon the additional information and the other information not connected with the additional information according to the refinement condition obtained from the mobile terminal, and wherein the display device displays the plurality of images in at least one of a list format to display two or more of the plurality of images concurrently and a slide-show format to display one of the plurality of images by sequentially switching the plurality of images in such a manner that the additional information and the other information not connected with the additional information are distinguishable based on whether navigation to the related location is provided, wherein the display device displays a destination button only when an image displayed on the display device is appended with the additional information specifying at least one of the location of the image, the location of the provider of the image and the shooting location of the image, wherein, in response to the destination button being operated by the user, the control devices sets the related location from the additional information of the image as the destination for the navigation function, and wherein the display device includes a vehicle-side control portion that provides navigation guidance for the navigation function to guide the vehicle to the destination.

15. An image display system comprising:

a server having a storage device that stores a plurality of images; and a mobile terminal installed in a vehicle having a display device that displays the plurality of images acquired from the server, wherein the mobile terminal includes:
- an operation input device that performs an operation to input a refinement condition according to a theme or a keyword selected by a user for specifying an image type desired by the user without being specified by a location and an operation to select at least one of the plurality of images displayed on the display device based upon the image type; and a control device that sets a related location related to the at least one of the plurality of images selected by the operation input device as a destination for a navigation function, wherein the storage device stores for each image: additional information to specify at least one of a location of the image, a location of a provider of the image, and an shooting location of the image; and other information not connected with the additional information, wherein the server includes an extraction device that extracts the at least one of the plurality of images based upon the additional information and the other information not connected with the additional information according to the refinement condition obtained from the mobile terminal, wherein the control device restricts at least a part of an input operation on the operation input device or a display operation by the display device when the control device determines that a vehicle is travelling, and wherein the display device displays the plurality of images in at least one of a list format to display two or more of the plurality of images concurrently and a slide-show format to display one of the plurality of images by sequentially switching the plurality of images in such a manner that the additional information and the other information not connected with the additional information are distinguishable based on whether navigation to the related location is provided, wherein the display device displays a destination button only when an image displayed on the display device is appended with the additional information specifying at least one of the location of the image, the location of the provider of the image and the shooting location of the image, wherein, in response to the destination button being operated by the user, the control devices sets the related location from the additional information of the image as the destination for the navigation function, and wherein the display device includes a vehicle-side control portion that provides navigation guidance for the navigation function to guide the vehicle to the destination.

* * * * *